United States Patent

[11] 3,574,961

| [72] | Inventor | William C. Bond<br>Rte. 1, Clinton, S.C. 29329 |
|---|---|---|
| [21] | Appl. No. | 736,615 |
| [22] | Filed | June 13, 1968 |
| [45] | Patented | Apr. 13, 1971 |

[54] AUTOMATIC LOADING AND UNLOADING DEVICE
6 Claims, 5 Drawing Figs.

[52] U.S. Cl. ............................................. 37/8,
37/129, 198/9
[51] Int. Cl. ............................................. B60p 1/36
[50] Field of Search ............................................. 37/4, 7, 8, 108, (SVL); 214/500—504, 507, 508, 509, 519—522; 198/8, 9

[56] References Cited
UNITED STATES PATENTS

| 47,566 | 5/1865 | Quimby | 37/4X |
| 130,948 | 8/1872 | Smith | 37/8 |
| 229,602 | 7/1880 | Gray | 37/8X |
| 487,754 | 12/1892 | LaDue | 37/4X |
| 1,514,248 | 11/1924 | Bergman | 37/42 |
| 1,537,558 | 5/1925 | Schultz | 37/4 |
| 2,468,220 | 4/1949 | McLendon | 37/4X |
| 2,855,116 | 10/1958 | Moore | 37/4UX |
| 3,049,817 | 8/1962 | MacDonald | 37/108 |
| 3,050,879 | 8/1962 | Brown | 37/8 |
| 3,314,175 | 4/1967 | Petty et al. | 37/108 |

*Primary Examiner*—Robert E. Pulfrey
*Assistant Examiner*—Eugene H. Eickholt
*Attorney*—Newton, Hopkins and Ormsby

ABSTRACT: Automatic material loading and unloading apparatus comprising an activating ground wheel, a cutting blade or scoop, a conveyor system, a material holding means and a mechanism for dumping said material from said holding means.

Patented April 13, 1971

INVENTOR.
WILLIAM C. BOND
BY Newton, Hopkins,
& Ormsby
Attorneys

Patented April 13, 1971
3,574,961
2 Sheets-Sheet 2
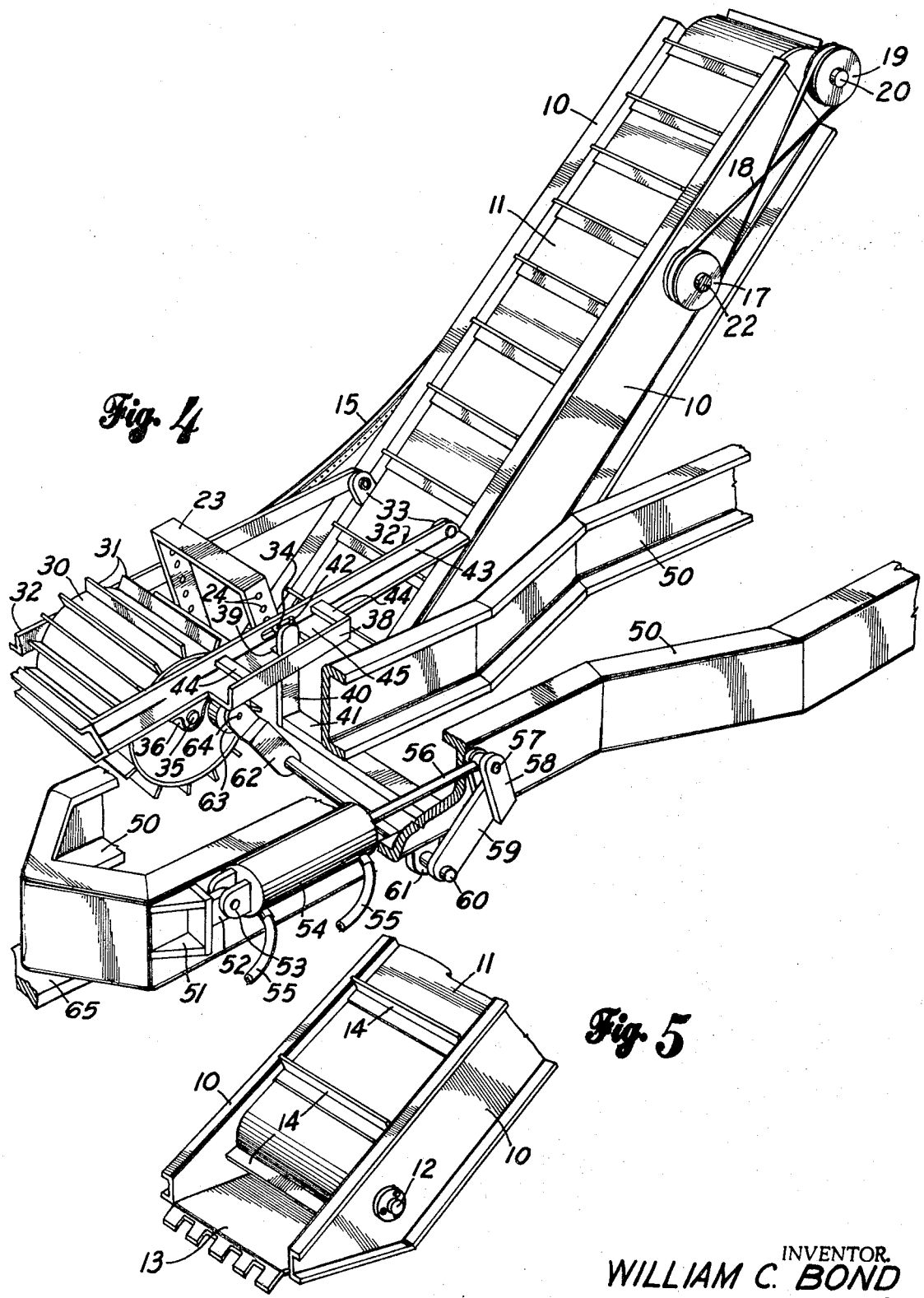
INVENTOR.
WILLIAM C. BOND
BY Newton, Hopkins, & Ormsby
Attorneys

AUTOMATIC LOADING AND UNLOADING DEVICE

There are a number of prior art material loading devices, for example loading dirt, which removes the dirt from a road grading operation. These devices are very cumbersome, complicated and heavy. In addition, they generally will operate only on dirt which has already been loosened from the ground an in a pile. Further, these devices generally move the dirt and place it in a separate container not part of the moving mechanism, itself, for example, a truck moving alongside the material moving device. Thus, two or more persons are necessary for the total operation of loading the material and removing it from the area, to be disposed of elsewhere. This is expensive and time consuming. Generally, these prior art devices have no control over the depth of the material they are removing, which results in clogging the mechanism. This obviously is costly in time lost in cleaning the mechanism so it may be placed again in operation.

Due to the size and weight of these prior art loading devices, they are limited as to the type or conditions of an area where they may perform. If the area is quite rough, they cannot be brought into the area, much less perform their designed function.

It is therefore the primary object of this invention to provide an automatic material loading and unloading device.

Another object of this invention is to provide an automatic material loading an unloading device which is light of construction and simple of design.

An additional object of this invention is to provide an automatic material loading and unloading device which can be operated by one person.

A further object of this invention is to provide an automatic material loading and unloading device which can control the depth to which it will excavate or remove material from the ground.

A still further object of this invention is to provide an automatic material loading and unloading device which is a single unit.

A further object of this invention is to provide an automatic material loading and unloading device which may be swiftly and easily removed from the area of operation, dispose of the material and return to the area of operation.

These and other objects, features and advantages of the present invention will be apparent from consideration of the following detailed description taken in conjunction with the accompanying drawings. Like numbers will be used throughout the several drawings to designate like parts.

FIG. 4 is a perspective view of the activating drum, loading end of the conveyor assembly stabilizing means and activating drum and excavating control means.

FIG. 5 is a fragmentary perspective view of the loading end of the conveyor assembly and the attached excavating means.

Figure 1:
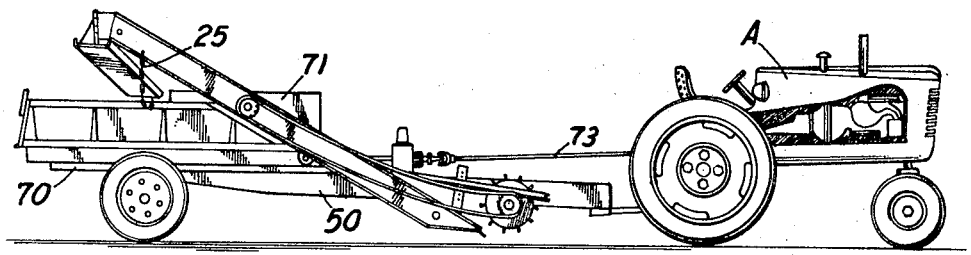
FIG. 1 is a side elevation view of the automatic loading and unloading mechanism attached to a power source, a tractor.
Figure 2:
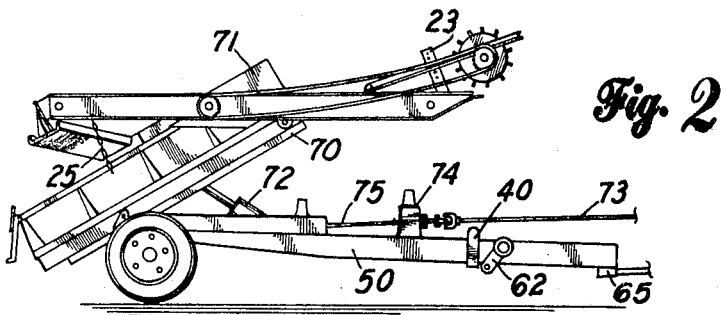
FIG. 2 is a side elevation view of the automatic loading and unloading mechanism of FIG. 1 in a dumping position.
Figure 3:
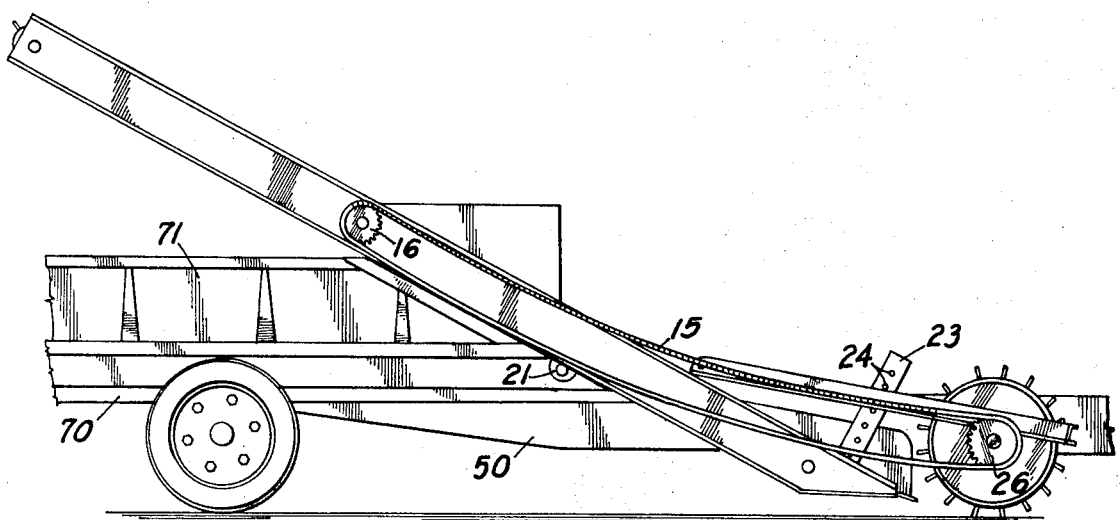
FIG. 3 is an enlarged side elevation view of the activating drum and conveyor assembly of the automatic loading and unloading mechanism.

Generally, the objects of this invention are accomplished by combining in a light unit a scooping or digging mechanism with its conveyor system which is attached to a holding and dumping means, all in one unit, which is powered by a conventional power source, such as a tractor shown at A.

More specifically, the objects of this invention are accomplished by providing a pair of spaced, parallel frame members 10, which support endless conveyor belt 11 by means of rotatable rods 12 and 20, rod 12 being positioned at the lower loading end of said frame members and rod 20 being located at the upper end of said frame members 10. Frame members 10 are also supported by internal fixed beams spaced from each other and covered by endless conveyor belt 11, not shown in the drawings. Endless conveyor belt support frames 10 are hinged at 21 to the frame 70 of the material holding container, which allows the entire material excavating assembly to be raised from the ground or material being loaded, so it will not come in contact with any surface when it is being moved away from the area of excavation. Running vertically across said endless conveyor belt are perpendicular projections 14 spaced apart. These projections may be 1 inches to 3 or 4 inches in height. They are the means which carry the material being excavated up the conveyor belt to the material holding container. At the forward and lower end of frame members 10 is attached excavating means 13, which is a serrated blade positioned forwardly and slightly below the loading end of the conveyor belt and attached to frame members 10 of the conveyor belt assembly.

There is an activating means for the conveyor belt assembly positioned forwardly and slightly below said excavating means 13 which is adjustable connected to the forward loading end of the conveyor frames 10. This activating means is a closed drum 30 with spaced, perpendicular projections 31 thereon which run the entire width of the drum. These projections engage the surface in a forward counterclockwise motion. Activating member 30 is adjustable, attached to conveyor frames 10 at 33 by a conventional bracket and pin assembly which is attached to the rearwardly end of a pair of support frame 32 which extend from the conveyor frames 10 outwardly beyond the forward edge of drum 30. Activating drum 30 is positioned between the two support members 32 by a rotatable shaft 35 which is positioned at the forward end of the support members 32 by brackets 36. The support brackets 32 are typical angle irons composed of a vertical section 43 and a horizontal section 37. At the forward end of conveyor support frames 10 and rigidly attached in a vertical position is an inverted U-shaped member 23 which has a series of holes 24 on each of the vertical support legs of the U-shaped means. These holes are in vertical alignment with each other. This member 23 gives rigid support to activating means 30 by attachment of means 30 by attachment of means 23 to the pair of activating member support frames 32 by pins 42 passing through holes 24 of the support member 23 on through a slot 34 in each of the support members 32. Thus, one can adjust the height at which activating means 30 will engage a surface above the excavating member 13 and in addition give rigid support to activating means 30, by selecting the desired hole 24 and engaging the hole with support means 32 by inserting pin 43 therethrough.

As activating drum 30 rotates in a counterclockwise direction upon the surface of the material to be loaded, this motion activates a sprocket wheel 26 on the outer side of said drum and attached thereto at the outer end of shaft 35. When sprocket wheel 26 is activated, it in turn moves a conventional bicycle link chain 15 in a counterclockwise direction. This chain 15 runs up the outer side of the conveyor frame 10 and terminates at another sprocket wheel 16 which is rotatably attached to frame 10 by rotatable shaft 22 which passes through both of the support frames 10 of the conveyor system. On the inwardly side of the conveyor assembly, another sprocket wheel 17 is positioned; therefore, when drum 30 is activated, it in turn activates chain 15, which through sprocket wheel 16 activates sprocket wheel 17. Sprocket wheel 17 is engaged with another conventional bicycle link chain on a similar link chain 18 which is twisted and is engaged to sprocket wheel 19 which is at the upper unloading end of the conveyor system. Wheel 19 is rotatably attached to the inner frame 10 of the conveyor system by a rotatable shaft 20 which passes through both frames 10 of the conveyor system. Thus, with the twisting of chain 18 the counterclockwise motion of drum 30 is reversed and the movement of the endless conveyor belt 11 is in a clockwise motion. Conveyor belt 11 is activated by rotatable shaft 20 which moves in a clockwise direction which is the opposite motion to the movement of activating drum 30. Thus, as the drum rotates in one direction, the endless conveyor belt moves in the opposite direction, moving the material to be loaded up itself and deposited in the holding means. Endless conveyor belt 11 merely moves over and around lower rotatable shaft 12 which does not give it any motion as to direction. It is merely a support means. Said belt may be manufactured out of any strong, flexible material such as reinforced canvas, etc.

In order to prevent side movement of activating mechanism 30 and its support members 32 while it is in operation, there is provided a stabilizing device. This device is composed of a projection from the inwardly support member 32, composed of two support beams 44 spaced apart and projecting at a right angle and parallel to 32, and connected together by beam 38. Beam 38 and support projections 44 encompass a plate 45 which has a slot 39 in said plate. Support rod 41 extending from support frames 50 has a projection rod 40 at right angle and attached to the other end of 41. This rod 40 is slidably engaged in slot 39. Thus, activating mechanism 30 may be raised and lowered and adjusted while at the same time rod 40 maintains this activating mechanism in a steady fashion through slot 39 so it will not move sidewardly while in operation.

Material holding means 71 is a conventional type of holding means for the materials which have been excavated and loaded up the endless conveyor system into said holding means. This material holding and dumping means frame 70 is supported by a pair of support frames 50 which are spaced apart and parallel coming together at the forward end and maintained apart rearwardly where the material holding container 71 is supported thereon. Also, a conventional dumping activating means 72 is positioned rearwardly between the two parallel support frames 50. Said dumping mechanism 72 is activated from a conventional power source such as a tractor, by rod 73 which passes through gearbox 74 and rod 75 extends from said gearbox to activate the conventional dumping mechanism 72. This mechanism is completely conventional and no detailed description is given.

To the forward end of the spaced-apart parallel support frames 50 is attached connecting piece 65 which attaches to a conventional motor means which will pull the entire loading and unloading device forward, such as a tractor or a truck with a power offtake. There is located on the forward end of the outer support frame 50 a support bracket 51 which supports rigidly a projection 52 to which is attached a conventional hydraulic system tank 54 by bracket and pin 53, said tank being rotatably engaged to projection 52 and having fluid entrance and exit conduits 55. Extending from the other end of hydraulic tank 54 is an activating rod 56 which is rotatably engaged to a linking means 58 by pin 57 which passes through linking means 58 and activating rod 56. Linking means 58, which is a pair of parallel metal strips, is attached rigidly to an additional metal strip 59. Metal strip 59 at its other end is attached to a rotatable rod 60 which passes through metal piece 59 and under support frames 50, being supported by brackets 61. This rotatable rod passes under frames 50 in an outwardly direction, towards activating mechanism 30. At the other end of rotatable rod 60 is a metal plate 62 which extends upwardly at a right angle adjacent to and beneath the activating support means 32. At the upper end of metal plate 62 is rotatably engaged wheel 63 by pin 64. Thus, when the hydraulic rotatable means 58 is activated in a clockwise direction, this clockwise motion is transferred to wheel 63 which moves in a rearward direction away from the activating mechanism 30, engaging the underside of plate 45. This in turn raises activating mechanism 30 and disengages it from the surface upon which it is in contact. As activating mechanism 30 by its various adjusting means is firmly attached to endless conveyor belt support frame 10, with the movement of wheel 63 in a rearwardly direction, this motion lifts not only activating means 30 but the entire endless conveyor belt assembly. Thus, this mechanism is now in position disengaged from its operating surface, so that it may now be moved from the area of operation to the area of disposal.

As a summary, endless conveyor belt mechanism 11 and its supporting members is in a hinged relationship with material holding and dumping means 71. When the motion source of this entire assembly moves forwardly, and activating mechanism 30 has been adjusted and positioned on the operating surface, with the forward motion of the motor source, activating mechanism 30 moves in a counterclockwise direction, said motion being reversed as to the endless conveyor belt through the various sprocket and link chain means. As scoop 13 gouges or digs up the material which is loaded on endless conveyor belt 11, this material is moved up the conveyor belt and deposited into the material holding and dumping container 71. The removal of the material from the upper end of said endless conveyor is conventional. Once the material holding and dumping container 71 is filled, then hydraulic tank means 54 is activated and by its counterclockwise motion of means 58 and 59, wheel 63 is activated in a rearwardly direction which moves it across the undersurface of plate 45 which lifts activating mechanism 30 and its support members as well as the endless conveyor belt 11 and its support members away from the surface being dug or scraped. The entire loading and unloading mechanism is now in a position of disengagement to the surface being excavated, and the entire loading and unloading, material holding and motor source means can now be moved away from the area of operation and the material disposed of elsewhere. This entire loading and unloading apparatus may be operated by one person who obviously is located in the motor means source. While the entire apparatus is being removed from the area of excavation, a chain 25 may be attached to the upper end of endless conveyor support member 10 and attached to the side of material holding and dumping container 71. This is merely for the sake of convenience and gives support to the upper end of the endless conveyor belt assembly while it is in motion away from the excavating area.

Thus, one person has loaded a container full of material to be removed from the area of operation, and has moved the entire loading and unloading apparatus away from the area of operation and dumps the materials which have been excavated by activating dumping means 72. Once the materials have been unloaded from container 71 and said container is back in its original position on frame 50, the entire assembly is ready to be moved back to the area of excavation and one may proceed to excavate additional materials and load the holding and dumping container 71 for removal again. This entire loading and unloading has been accomplished by one person and in a simplified method as to time and effort involved. This is quite an advantage over the digging means of the prior art where several persons are involved in the complete operation and several pieces of separate equipment are involved, not a single unitary apparatus as in this invention.

It is obvious that many changes and variations may be made in the above invention without departing from the true scope and spirit thereof as defined by the appended claims.

I claim:

1. A material loading and unloading device comprising:
   a. a first frame;
   b. wheels on said first frame by which said frame can be supported on and moved over the ground in a forwardly or rearwardly direction;
   c. an open top container having a pair of opposed sides, a front and a back, said container being pivotally mounted on said frame for movement about a transverse axis from a generally horizontal position for receiving material to an inclined position for discharging material therefrom;
   d. an upwardly and rearwardly inclined conveyor means mounted adjacent one of said sides of said container and also adjacent the side of said frame for moving material from a position adjacent the ground to a position above said container and for discharging such material into said container;
   e. first power means for moving said container from its inclined position and back to its generally horizontally position; and f. second power means for driving said conveyor means; said conveyor means including an endless conveyor and a second frame being adapted to be pivoted with said container as said container is moved from its generally horizontal position to its inclined position said second power means being a traction means disposed forwardly of the front end of said conveyor on said second frame for driving said conveyor as said tractor means is moved over the ground, said traction means being a drum and including brackets for rotatably supporting said drum, said brackets being pivotally connected to said second frame for raising and lowering of said drum relative to the front end of said conveyor.

2. The structure set forth in claim 1 including means for raising and lowering said drum relative to the front end of said conveyor while remaining in driving relationship to said conveyor.

3. A material loading and unloading device comprising:
a. a first frame;
b. wheels on said first frame by which said frame can be supported on and moved over the ground in a forwardly or rearwardly direction;
c. an open top container having a pair of opposed sides, a front and a back, said container being pivotally mounted on said frame for movement about a transverse axis from a generally horizontal position for receiving material to an inclined position for discharging material therefrom;
d. an upwardly and rearwardly inclined conveyor means mounted adjacent one of said sides of said container and also adjacent the side of said frame for moving material from a position adjacent the ground to a position above said container and for discharging such material into said container;
e. first power means for moving said container from its generally horizontal position to its inclined position; and
f. second power means for driving said conveyor means; said conveyor means including an endless conveyor and a second frame connected to said container, said second frame being adapted to be pivoted with said container as said container is moved from its generally horizontal position to its inclined position; said second frame being pivotally connected to said container; and means for adjusting the angular position of said second frame with respect to said container.

4. The device set forth in claim 3 wherein said first frame is adapted to be towed by a tractor and said first means is a power takeoff from said tractor.

5. The device set forth in claim 3 wherein said second power means is a traction means disposed forwardly of the front end of said conveyor on said second frame for driving said conveyor as said tractor is moved over the ground.

6. The structure set forth in claim 5 wherein said traction means is a drum having circumferentially-spaced axially extended knives mounted on said drum for breaking up the ground material ahead of said conveyor and including a scoop carried by said second frame for receiving such material and for directing the same to said conveyor.